M. F. KÄSSMODEL.
PROCESS OF TREATING CACAO SEEDS TO SEPARATE UNRIPE FROM RIPE SEEDS.
APPLICATION FILED FEB. 16, 1909.
974,393.  Patented Nov. 1, 1910.
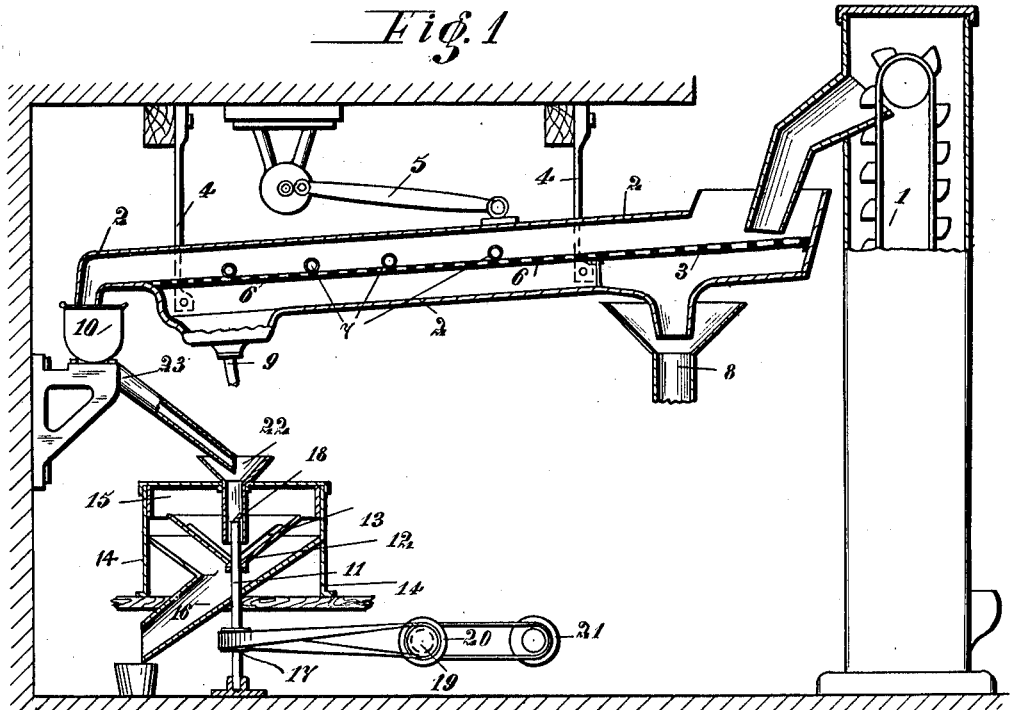
Witnesses
*A. J. Haddan*
*A. N. Gorrill*
Inventor
*Max Feodor Kässmodel*
By *R. Haddan*
Attorney

UNITED STATES PATENT OFFICE.

MAX FEODOR KÄSSMODEL, OF LEIPZIG, GERMANY.

PROCESS OF TREATING CACAO-SEEDS TO SEPARATE UNRIPE FROM RIPE SEEDS.

974,393.     Specification of Letters Patent.     Patented Nov. 1, 1910.

Application filed February 16, 1909. Serial No. 478,296.

*To all whom it may concern:*

Be it known that I, MAX FEODOR KÄSSMODEL, a subject of the King of Saxony, residing at Leipzig, in Germany, have invented certain new and useful Improvements in Processes of Treating Cacao-Seeds to Separate Unripe from Ripe Seeds, of which the following is a specification.

The principal object of this invention is to separate unripe from ripe cacao seeds.

A further object is to provide for more conveniently and efficiently removing the husks.

The cacao seeds which come under the treatment of the manufacturer are not uniformly mature, the ripe seeds being mixed with more or less unripe ones. Since only the ripe, well fermented or rotted seeds possess the full degree of aroma, while the unripe seeds have an astringent flavor, unless the seeds are carefully graded the quality of the manufactured product is greatly deteriorated by the presence of unripe seeds. Grading or sorting can be performed by hand, since the ripe and unripe seeds are usually distinguishable by color, but this process is too expensive to be adopted in practice.

It is well known that ripe seeds can be more easily crushed by hand, even when unroasted, than the unripe seeds. This is due to the fact that the structure of the cotyledons becomes looser with advancing maturity. The present invention utilizes this fact for the purpose of sorting the seeds according to their degrees of maturity.

It has hitherto been usual to crush the seeds by means of cylinders, after the roasting, the ripe and unripe seeds being broken and mixed, together with their husks. According to the present invention the seeds are not crushed by cylinders but receive a blow or impact the force of which is so calculated that the ripe seeds are crushed, but the unripe seeds remain whole. The degree of maturity at which the separation takes place can be varied by varying the force of the blow, and by carrying out the operation in successive stages, with blows of increasing force, the seeds can be graded as exactly as desired, according to varying degrees of ripeness. The crushed seeds may be separated from the uncrushed seeds by sifting. This mode of treatment also facilitates the separation of the husks from the paste, and the separation is further facilitated by a steaming process, which causes a large proportion of the husks to remain nearly unbroken, as will be described hereinafter, whereas the process of crushing by means of cylinders breaks the husks into small particles. By the improved process the kernels also are less finely divided than by the cylinder process, and this also facilitates the process of separating the husks, inasmuch as the chief difficulty attending that separation is caused by the presence of small particles. Various means may be used for imparting blows or impacts of regulatable force, for the purpose set forth. The simplest method consists in dropping the seeds on to a hard surface, from a suitable height. Another method consists in projecting the seeds against a hard surface by means of an air current of regulatable force, or blows may be delivered on the seeds by means of suitable apparatus. The method preferred in practice consists in flinging the seeds against a hard surface by means of centrifugal force. Apparatus for this purpose will be described hereinafter.

For obtaining a more efficient or complete separation of husks and cotyledons without materially increasing the cost of manufacture, the whole seeds are separated from those which have become broken during the roasting process, and these whole seeds are subjected to the action of steam, while being shaken. The steam condenses on the husks and renders them tough and leathery, so that when the seeds are subsequently subjected to the above mentioned blow or impact the husks merely burst, and allow the cotyledons to slip out. The cotyledons are broken by the impact; the husks either remain entire, except at the slit formed by the bursting thereof, or break up into comparatively large pieces, many of which remain connected with each other, so that the husks can be easily separated. This produces the very important advantage that cotyledons practically free from husks can be obtained by means of very simple apparatus, at low cost. Even in the case of thick-skinned cacaos (Guayaquil, Carácas, etc.) the proportion of non-separable husk is small. The apparatus required for the steaming process can be combined with the conveyer by which the seeds are transferred from the roasting apparatus to the centrifugal apparatus. The amount of space required by the steaming apparatus is small.

Apparatus for carrying out the operations described is shown in the annexed drawing, in which—

Figure 1 is a vertical section thereof, and Fig. 2 a plan view.

The elevator 1 conveys the seeds from the roasting apparatus or store-room to the partly closed, inclined trough 2, which is suspended by means of springs 4 and is longitudinally vibrated by means of the pitman 5. The seeds fall on to the false bottom of the trough, formed by the sieves 3 and 6. Adjacent to the sieve 6 there are steam jets formed for example of perforated pipes 7, connected to a source of steam 7¹ by flexible pipes 7². Below the other sieve 3 the trough has an aperture located above the hopper 8, into which are discharged the particles of accidentally broken seeds which fall through the sieve 3. The water of condensation is discharged through the pipe 9 connected to the lower end of the trough, and carries with it whatever particles of solid matter fall through the sieve 6. Instead of a trough, other means may be used for agitating and conveying the seed while it is treated with steam, for example an axially inclined, perforated drum, which may be cylindrical or polygonal, and may contain a sieve or sieves of varying degrees of fineness. Steam may be supplied to a drum of this kind through a hollow axle. The trough 2 terminates above a conveyer 10, which may be of any suitable type. If the seed is to be stored after its treatment with steam, the conveyer 10 may be arranged to convey it to sacks or the like used for purposes of storage. In the construction illustrated, the conveyer 10 transfers the seed to the chute 23, down which the seed slides to the hopper 22 of the centrifugal apparatus. The purpose of the latter, as already explained, is not merely to split the husks and break the kernels, but also to effect the separation of the unripe seeds from the ripe seeds.

The plate 12 of the centrifugal machine, on to which the seed falls, is an inverted, hollow cone fixed to the vertical shaft 11. This plate has on its upper or inner surface ribs 13. The ring or cylinder 15 in the upper part of the casing 14 is of cast iron or other hard material, and has ribs or sharp projections. The coned floor below the plate 12 has a central aperture and is integral with an inclined discharge pipe 16. The shaft 11 is driven by means of belt-connected pulleys 17, 19, 20 and 21, the pulleys 20 and 21 being coned to allow of regulating the speed by shifting the belt thereon. The upper end of the shaft 11 is within the tubular lower part of the hopper 22, and a projecting finger 18 on the shaft insures a regular flow of seed from the hopper. The seeds falling on to the rotating plate 12 are carried around by means of the ribs 13 and are then flung by centrifugal force against the ring 15. The force of impact, which is regulated by regulating the speed of the shaft, is such that the ripe seeds burst and the unripe seeds remain whole, the kernels of the ripe seeds being at the same time broken. From the ring 15 the mixture of crushed and uncrushed seeds falls on to the coned floor and thence slides through the discharge pipe 16, to be subsequently separated by sifting.

What I claim as my invention and desire to secure by Letters Patent of the United States is:—

1. The method of treating cacao seeds to separate unripe from ripe seeds consisting in steaming them and subsequently submitting them to an impact of sufficient force to crush ripe seeds but insufficient to crush unripe seeds.

2. The process of treating roasted cacao seeds to separate unripe from ripe seeds consisting in sifting out broken seeds, steaming the unbroken seeds, submitting the latter to impact of sufficient force to crush ripe seeds but insufficient to crush unripe seeds, and subsequently separating the crushed from the uncrushed seeds.

3. The process of treating roasted cacao seeds to separate unripe from ripe seeds consisting in sifting out broken seeds, steaming the unbroken seeds, projecting the latter against a wall with sufficient force to crush ripe seeds but insufficient to crush unripe seeds, and subsequently separating the crushed from the uncrushed seeds.

4. The process of treating cacao seeds to separate unripe from ripe seeds consisting in steaming the seeds, submitting the seeds to impact of sufficient force to crush the ripe seeds, but insufficient to crush the unripe seeds, and subsequently separating the crushed from the uncrushed seeds.

5. The process of treating cacao seeds to separate unripe from ripe seeds consisting in steaming the seeds, projecting the seeds against a surface with sufficient force to crush the ripe seeds, but insufficient to crush the unripe seeds and subsequently separating the crushed from the uncrushed seeds.

6. The process of treating cacao seeds to separate unripe from ripe seeds consisting in sifting out broken seeds, steaming the unbroken seeds, and submitting the latter to impact of sufficient force to crush the ripe seeds, but insufficient to crush the unripe seeds.

7. The process of treating cacao seeds to separate unripe from ripe seeds consisting in sifting out broken seeds, steaming the unbroken seeds, and projecting the latter against a surface with sufficient force to crush the ripe seeds, but insufficient to crush the unripe seeds.

In witness whereof I have signed this specification in the presence of two witnesses.

MAX FEODOR KÄSSMODEL.

Witnesses:
 HERM. TARK,
 RUDOLPH FRICKE.